(12) United States Patent
Yamada et al.

(10) Patent No.: US 8,087,814 B2
(45) Date of Patent: Jan. 3, 2012

(54) BATCH MIXER

(75) Inventors: Norifumi Yamada, Takasago (JP); Masaki Naoi, Takasago (JP); Ko Takakura, Takasago (JP); Masao Murakami, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 58 days.

(21) Appl. No.: 10/793,926

(22) Filed: Mar. 8, 2004

(65) Prior Publication Data

US 2004/0179424 A1 Sep. 16, 2004

(30) Foreign Application Priority Data

Mar. 12, 2003 (JP) .................. 2003-066121

(51) Int. Cl.
*B29B 7/18* (2006.01)
(52) U.S. Cl. ............ 366/76.8; 366/76.7; 366/76.9; 366/97
(58) Field of Classification Search ............ 366/76.7, 366/76.8, 76.9, 84, 85, 97, 291, 297–301; 241/236
See application file for complete search history.

(56) References Cited

U.S. PATENT DOCUMENTS

| | | | | | |
|---|---|---|---|---|---|
| 3,633 | A | * | 6/1844 | Goodyear | 156/276 |
| 251,848 | A | * | 1/1882 | Duryee | 241/236 |
| 506,384 | A | * | 10/1893 | Werner | 165/109.1 |
| 534,968 | A | * | 2/1895 | Pfleiderer | 366/97 |
| 635,412 | A | * | 10/1899 | Wurster | 366/300 |
| 690,506 | A | * | 1/1902 | Wurster | 241/159 |
| 1,523,387 | A | * | 1/1925 | Banbury | 366/76.7 |
| 1,623,159 | A | * | 4/1927 | Bowen et al. | 366/80 |
| 2,283,008 | A | * | 5/1942 | Le Bar et al. | 366/300 |
| 2,284,549 | A | * | 5/1942 | Yablonski | 366/81 |
| 2,829,399 | A | * | 4/1958 | Caracciolo et al. | 425/203 |
| RE26,147 | E | * | 1/1967 | Parshall et al. | 366/80 |
| 3,729,178 | A | * | 4/1973 | Stade | 366/84 |
| 4,053,144 | A | * | 10/1977 | Ellwood | 366/97 |
| 4,107,787 | A | * | 8/1978 | Ocker | 366/75 |
| 5,230,561 | A | * | 7/1993 | Nishimi et al. | 366/97 |
| 5,372,419 | A | | 12/1994 | Hagiwara et al. | |

(Continued)

FOREIGN PATENT DOCUMENTS

CN 87 2 10386 U 10/1988

(Continued)

OTHER PUBLICATIONS

Yamashita et al. "Collagen and Bone Viscoelasticity: A Dynamic Mechanical Analysis" Journal of Applied Biomaterials 2001, vol. 63, pp. 31-36.*

(Continued)

*Primary Examiner* — David Sorkin
(74) *Attorney, Agent, or Firm* — Oblon, Spivak, McClelland, Maier & Neustadt, L.L.P.

(57) ABSTRACT

A batch mixer having a barrel which forms a cylindrical sealed chamber having a section consisting of two mutually communicated circles, and two rotors housed in the chamber to mix a mixing material by rotation, at least one of the inner wall of the barrel and the surface of the rotor having a plurality of recessed parts or protruding parts. The recessed parts or protruding parts are formed of grooves or projections extended in the direction crossing to the rotating direction of the rotor rotated in the chamber to mix the material. According to this structure, a batch mixer excellent in the controllability of material temperature during mixing can be provided.

5 Claims, 8 Drawing Sheets

U.S. PATENT DOCUMENTS

| | | | |
|---|---|---|---|
| 5,433,522 A | 7/1995 | Ujihara | |
| 5,460,455 A | 10/1995 | Chen | |
| 5,520,455 A | 5/1996 | Yamada et al. | |
| 5,782,560 A | 7/1998 | Hatanaka et al. | |
| 5,783,983 A | 7/1998 | Ureshino et al. | |
| 5,791,776 A | 8/1998 | Takakura et al. | |
| 5,984,516 A | 11/1999 | Inoue et al. | |
| 2003/0128625 A1* | 7/2003 | Cabler, Jr. | 366/84 |

FOREIGN PATENT DOCUMENTS

| | | | |
|---|---|---|---|
| GB | 2 124 508 | * | 2/1984 |
| JP | 59-19525 | | 2/1984 |
| JP | 4-78919 | | 10/1992 |
| JP | 7133500 | | 5/1995 |
| JP | 9-220718 | | 8/1997 |
| JP | 2000-309017 | | 11/2000 |

OTHER PUBLICATIONS

Singh et al. "Structure and Mechanical Properties of Corn Kernels: a Hybrid Composite Material" Journal of Material Science 1991, vol. 26, pp. 274-284.*

Office Action issued Sep. 1, 2001, in Japan Patent Application No. 2008-122224 (w/English-language Translation).

* cited by examiner

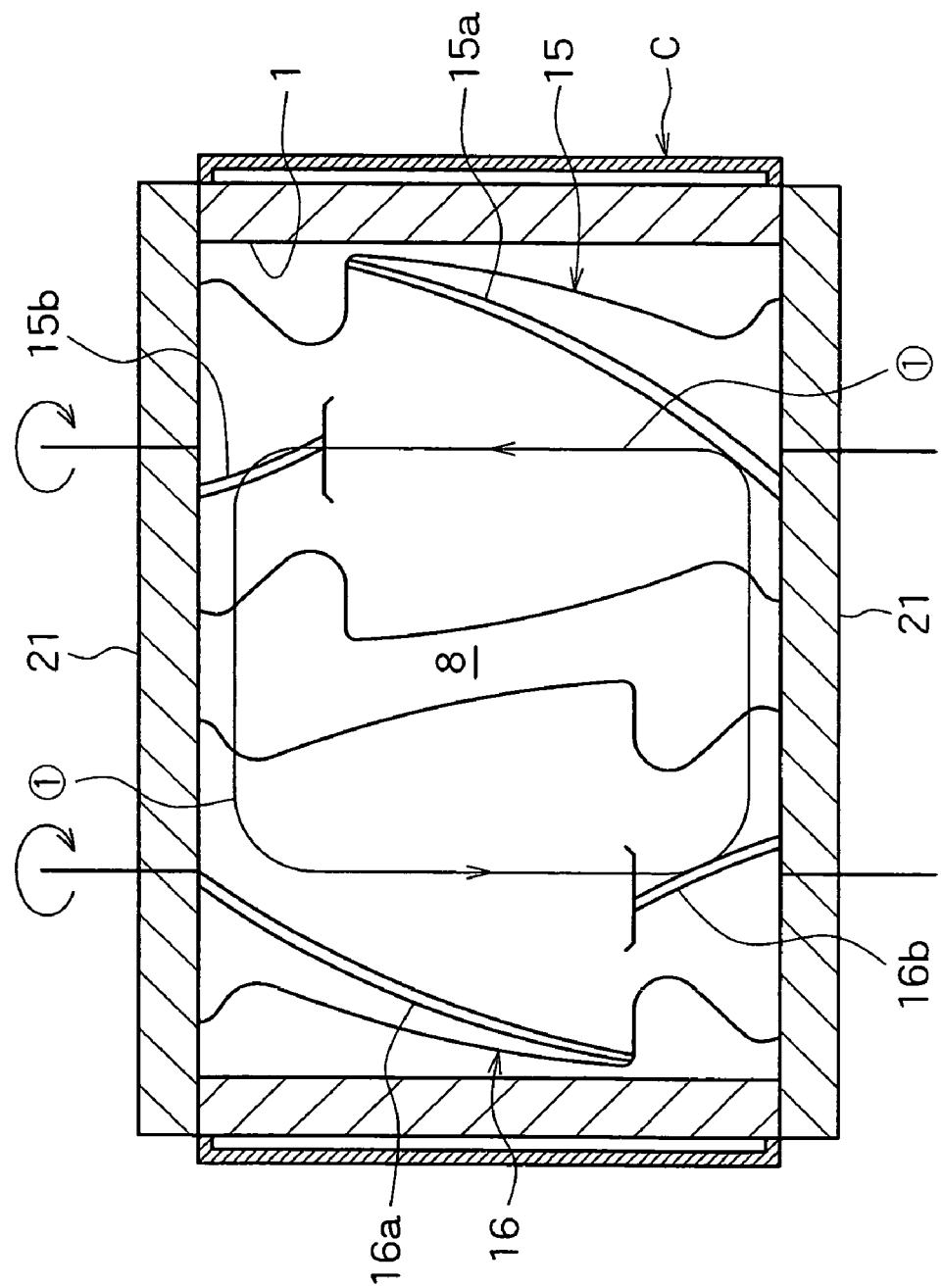

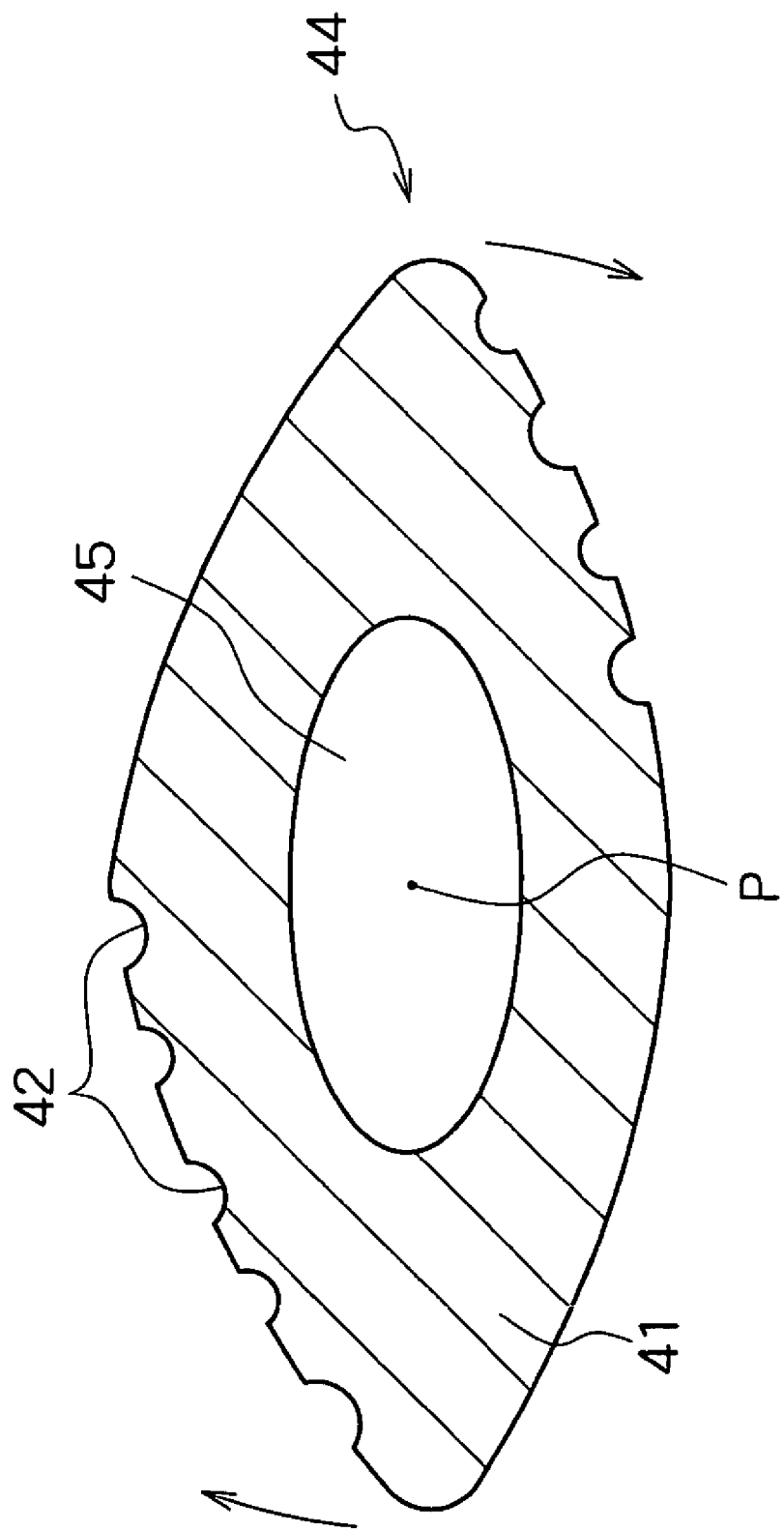

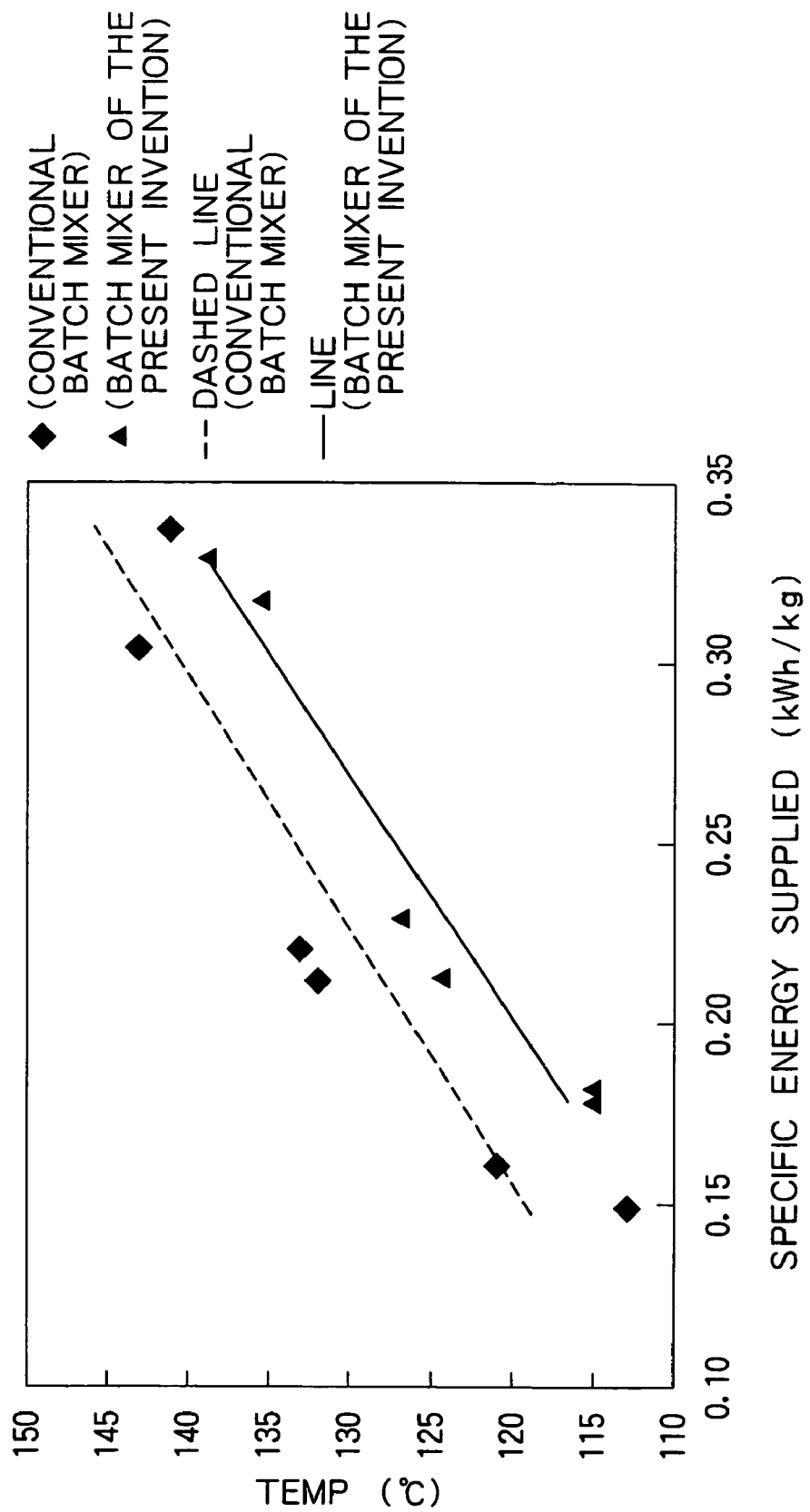

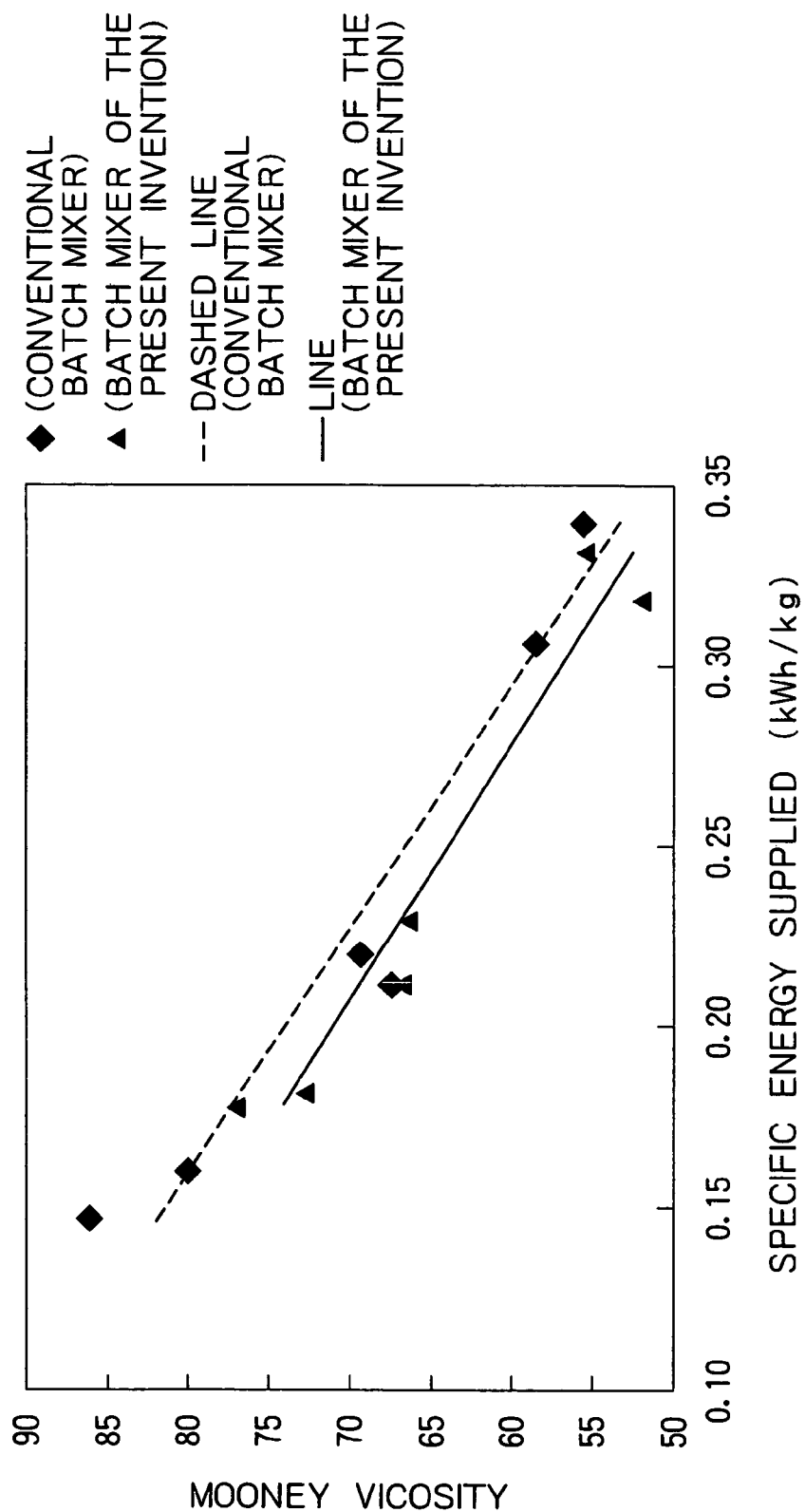

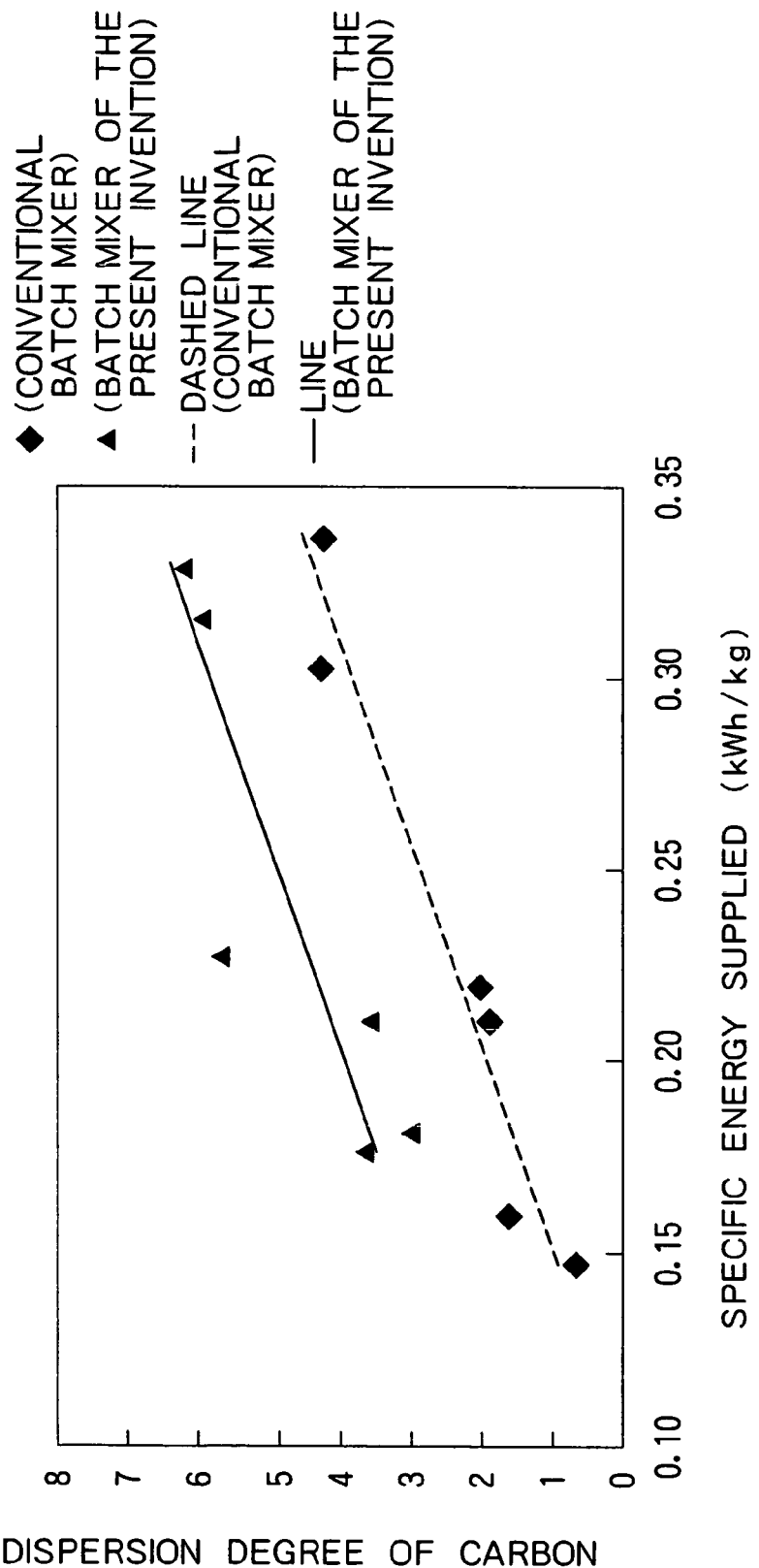

BATCH MIXER

BACKGROUND OF THE INVENTION

1. Field of the Invention

The present invention relates to a batch mixer for mixing material by rotating rotors in a chamber. More particularly, the present invention relates to a structure for controlling the internal temperature of the chamber (the temperature of a material to be mixed), which is raised during mixing, and further a structure for improving the fluidity of the material in the chamber.

2. Description of the Related Art

As conventionally known techniques for batch mixer, for example, a batch mixer is disclosed in Japanese Patent Application Laid-Open (Kokai) No. 9-220718. This mixer has a barrel which forms a cylindrical sealed chamber having a cross-section consisting of two mutually communicated circles, and two rotors housed in the barrel to mix a material by rotation, wherein the chamber has a first heat transfer passage on the outside of the chamber around each rotor, and extends between both axial ends of the chamber to circulate controlled fluid. The internal temperature of the chamber (the temperature of the material to be mixed) raised during mixing was controlled by such a structure.

However, the barrel inner wall of the batch mixer disclosed in Japanese Patent Application Laid-Open No. 9-220718 has a semi-cylindrical and smooth shape because the chamber diameter is constant. Consequently, the material under mixing are apt to slip on the contact surface with the barrel inner wall, which may make the contact surface difficult to renew. Namely, since the material is hardly evenly mixed in the vicinity of the contact surface, the temperature control of the material cannot be efficiently performed. Further, the temperature control is limited because of the limited contact area between the material and the barrel inner wall.

SUMMARY OF THE INVENTION

The prevent invention has been achieved to solve the above-mentioned problems.

Namely, the present invention provides a batch mixer having a barrel which forms a cylindrical sealed chamber having a cross-section consisting of two mutually communicated circles, and two rotors housed in the chamber to mix a material by rotation, wherein at least one of the inner wall of the barrel and the surface of the rotors has a plurality of recessed parts or protruding parts.

Since the material can be grasped without slippage as the action of each recessed part or protruding part as a slip stopper, the renewal of the material flow is facilitated. Since a sufficient shearing force is given to the material by the grasping effect by the protruding part or recessed part to improve the dispersibility, the quality of mixing is improved. Further, since the heat extraction performance through the barrel or rotors is improved by increasing in surface area of the barrel inner wall or rotors, the mixing energy applicable to the material up to a regulated discharge temperature can be increased to improve the quality of mixing.

The recessed part may be formed of a groove extended in the direction crossing to the rotating direction of the rotor.

The recessed part directed to the rotor axial direction across the rotating direction promotes the flow of the material to the rotor axial direction, so that the renewal of the contact surface of the material with the barrel inner wall can be effectively performed. Namely, the renewal of the material surface to make contact with the barrel inner surface can be promoted to improve the heat extracting effect, and the distributing property is improved by the promoting effect of the material flow by the recessed part. Accordingly, since the controllability of material temperature can be improved, the mixing energy applicable to the material up to the regulated discharge temperature can be increased to improve the quality of mixing.

The protruding part may be formed of a projection extended in the direction crossing to the rotating direction of the rotors.

The protruding part directed to the rotor axial direction across the rotating direction promotes the flow of the material to the rotor axial direction, so that the renewal of the contact surface of the material with the barrel inner wall can be effectively performed. Namely, the renewal of the material surface to make contact with the barrel inner surface can be promoted to improve the heat extracting effect, and the distributing property is improved by the promoting effect of the material flow by the protruding part. Accordingly, since the controllability of material temperature can be improved, the mixing energy applicable to the material up to the regulated discharge temperature can be increased to improve the quality of mixing.

BRIEF DESCRIPTION OF THE DRAWINGS

FIG. 2 is a cross-section taken along line Z-Z of FIG. 1;

FIG. 6 is a view showing an example of a rotor having recessed parts;

FIG. 7 is a graph showing the relation between temperature of mixing material and amount of specific energy supplied in examinations for a conventional batch mixer and the batch mixer of the present invention;

FIG. 8 is a graph showing the relation between Mooney viscosity and amount of specific energy supplied in examinations for the conventional batch mixer and the batch mixer of the present invention; and FIG. 9 is a graph showing the relation between dispersion degree of carbon and amount of specific energy supplied in examinations for the conventional mixer and the batch mixer of the present invention.

DESCRIPTION OF THE PREFERRED EMBODIMENTS

Embodiments of the present invention will next be described in reference to accompanying drawings.

Figure 1:
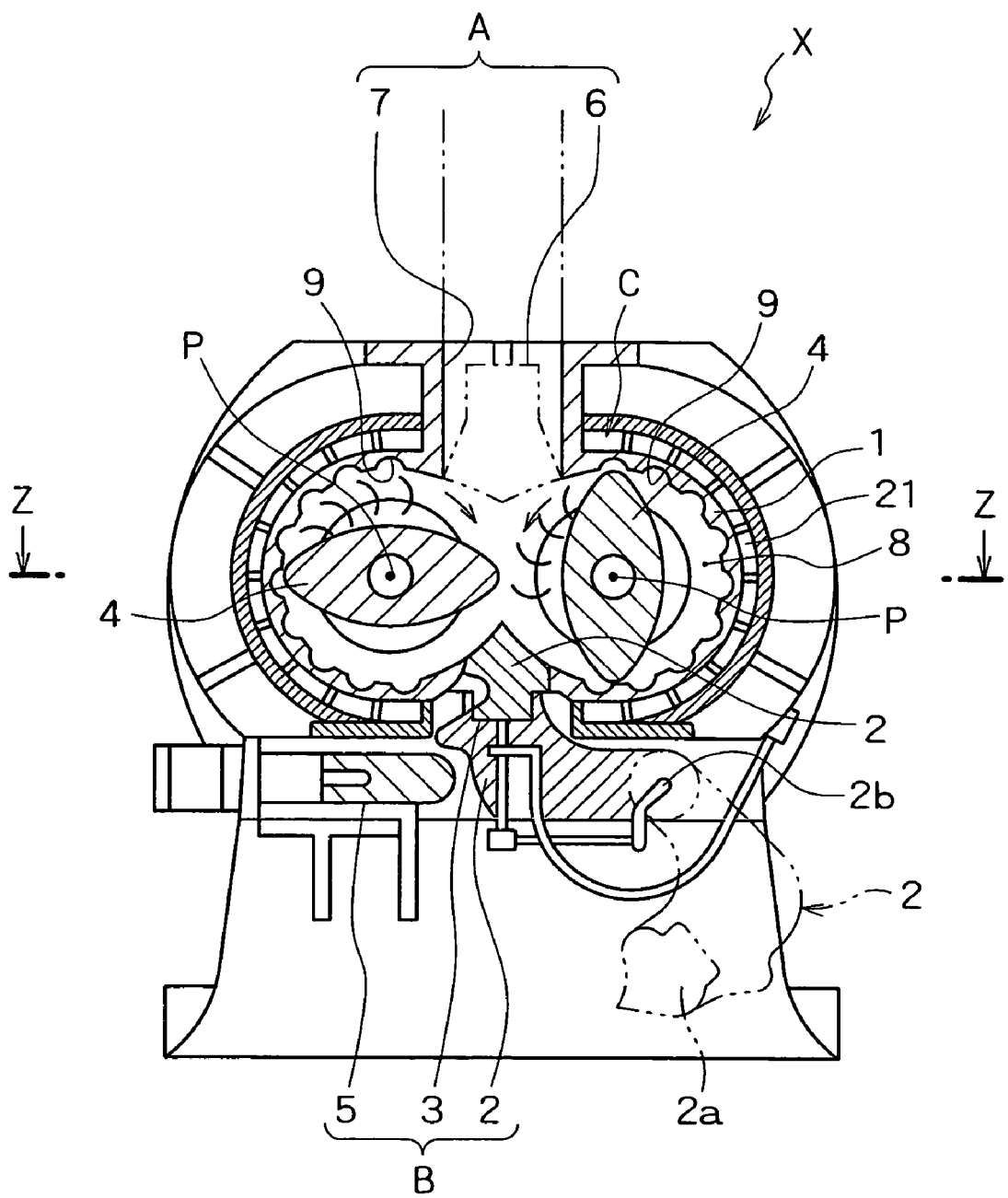
FIG. 1 is a cross-sectional view showing the entire structure of a batch mixer according to one embodiment of the present invention.

FIG. 1 is a cross-sectional view showing the entire structure of a batch mixer according to an embodiment of the present invention. FIG. 2 is a cross-section along line Z-Z of FIG. 1.

The batch mixer X has a barrel 1 which forms a cylindrical sealed chamber 8 having a cross section consisting of two mutually communicated circles, and two rotors 4 housed in the chamber 8 to mix material by rotation.

A material push-in device A is provided above the barrel 1, a discharging mechanism B is provided under the barrel 1, and a cooling mechanism C is provided around the barrel 1.

The material push-in device A comprises a feed port 7 provided above the chamber 8, a floating weight 6 to be pushed into the feed port 7, and a floating support mechanism for raising and lowering the floating weight 6 according to the pressure of the chamber 8.

A material (rubber, etc.) put into the feed port 7 through a vertically long chute (not shown) is pushed into the chamber 8 by the rising and falling of the floating weight 6 to partition the chamber 8 under the floating weight 6 raised and lowered by the internal pressure of the chamber 8.

The discharge mechanism B comprises a discharge port 3 provided under the chamber 8, an openable and closable drop door 2 for closing the discharge port 3, and a latch 5 for keeping the drop door 2 in a closed state.

The drop door 2 closes the discharge port 3 extended in the axial direction of the rotors 4 and 4 under the chamber 8 by a door top 2a to enable the mixing of the material by the rotors 4 and 4, and rotationally falls down around a fulcrum 2b, after the mixing of the material, to open the discharge port, so that the mixed material can be discharged. The opening and closing of the drop door 2 is performed by a drop door control circuit of a hydraulic control device (not shown).

The latch 5 is pressed onto the drop door 2 to push up the drop door 2 toward the barrel 1 side, clamps it so as to retain the sealing property in the chamber 8 during the mixing of the material, and retreated from the drop door 2 after the mixing the material to allow the open (clamp open) of the drop door 2.

The cooling mechanism C is formed by a passage 21 formed on the circumference of the barrel 1 except the part provided with the material push-in device A and the discharge mechanism B. The passage 21 is arranged so as to carry a cooling medium zigzag in the axial direction of the barrel 1 to efficiently cool the inside of the barrel 1. The cooling medium is forcedly passed through the passage 21 in a general operation. The cooling mechanism C can perform heating also by passing a heat medium. The passage 21 zigzagged in the axial direction is formed by use of a welding jacket structure, a drill structure, a cast hole structure.

The barrel 1 forms the cylindrical sealed chamber 8, in which the cross section is formed in two laterally communicated circles with the lower part of the floating weight (material push-in device A) and the door top 2a of the drop door 2 (the discharge mechanism B) as shown in FIG. 1, and the side surfaces are closed by end plates 21 as shown in FIG. 2. The two rotary rotors 4 and 4 are arranged in the chamber 8.

As shown in FIG. 2, rotors 15 and 16 in the barrel 1 have two blades each consisting of long blades 15a and 16a and short blades 15b and 16b, respectively. These blades 15a, 16a, 15b and 15b are inclined from both ends of the rotors 15 and 16 to the center side in the reversely rotating direction of the rotors 15 and 16, with one-side blades acting as feeding blades, and the other as returning blades. Both the blades are shifted in phase in the rotating direction, and independent to each other.

The rotors 15 and 16 shown in the drawing are of non-meshing type in which they are rotated in dissimilar directions without mutually meshing, and the rotating speeds of the dissimilar directional rotations are differed in a fixed ratio (e.g., 1:1.2). The rotors 15 and 16 of the batch mixer of this embodiment are not limited by the above. For example, the rotors 15 and 16 may be of meshing type in which they are rotated at the same speed, in addition to the above-mentioned dissimilar directional rotation. The number of blades in the rotors 15 and 16 may be 1 or 3, and the arrangement of the blades may be differed.

In the barrel 1 of FIG. 2, where the rotors 15 and 16 are rotated in dissimilar directions, the mass of material flows in the inclined direction of the long blades 15a and 16a and short blades 15b and 16b while receiving a shearing effect in the tip clearance between the blade tips of the rotors 15 and 16 and the inner wall of the barrel 1 to perform a so-called macro dispersion of uniformly mixing additives to the material.

Since the rotors 15 and 16 are rotated in dissimilar directions, the material also flows between the lateral chambers. Accordingly, the mixing material gradually largely circulates as the whole within the barrel 1 as shown by ① in FIG. 2 to perform the so-called macro dispersion of uniformly mixing the additives to the material.

The inner wall of the barrel 1 has, as shown in FIG. 1, recessed parts 9 in the direction crossing to the rotating direction of the rotor 4.

FIG. 3 shows development examples of the inner wall of the barrel 1.

Figure 3A:
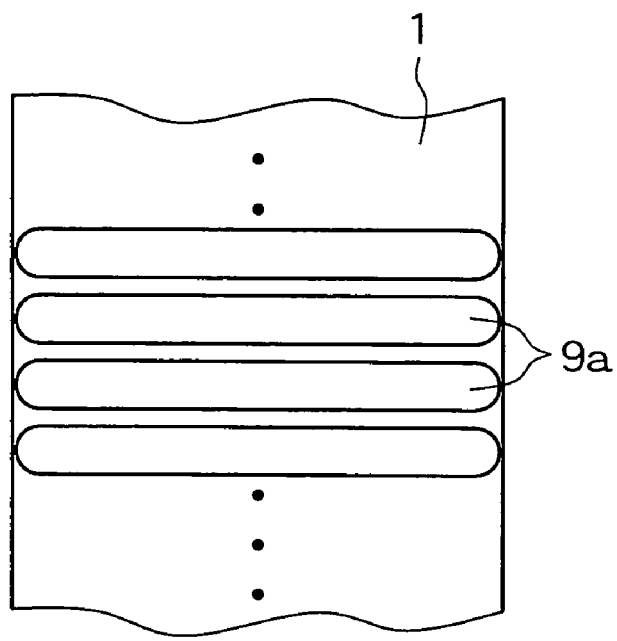
FIGS. 3(a) and (b) are views showing development examples of a barrel inner wall in the batch mixer of the present invention.
Figure 3B:
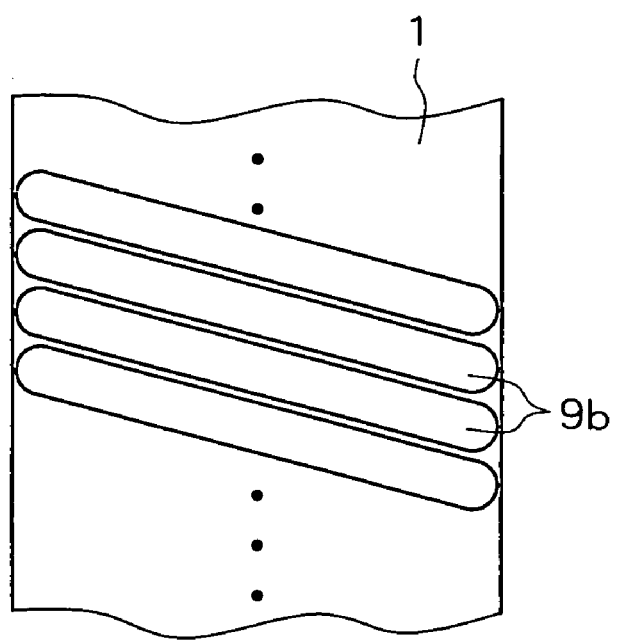

Grooves may be provided vertically (in the axial direction of the rotor 4) to the rotating direction of the rotor 4 as recessed parts 9a of FIG. 3(a). Otherwise, grooves as recessed parts 9b may be provided spirally with a prescribed twisting angle as shown in FIG. 3(b). The twisting angle in FIG. 3(a) is 0°, and the twisting angle in FIG. 3(b) is 0-60°.

The non-slip effect of the material to the barrel inner wall can be obtained by providing grooves. Consequently, the renewal of the contact surface of the material with the barrel inner wall can be effectively performed, and the distributing property of the material is improved. Since the controllability of the material temperature can be improved, the mixing energy applicable to the mixing material up to a regulated discharge temperature can be increased to improve the quality of mixing. Further, the flow of the material to the axial direction of the rotor 4 can be also promoted.

The above effects can be further improved by providing the grooves extended in the direction crossing to the rotating direction of the rotor as shown in FIG. 3. The recessed parts shown in FIGS. 3(a) and (b) are easy to work because of the groove shapes.

Figure 4:
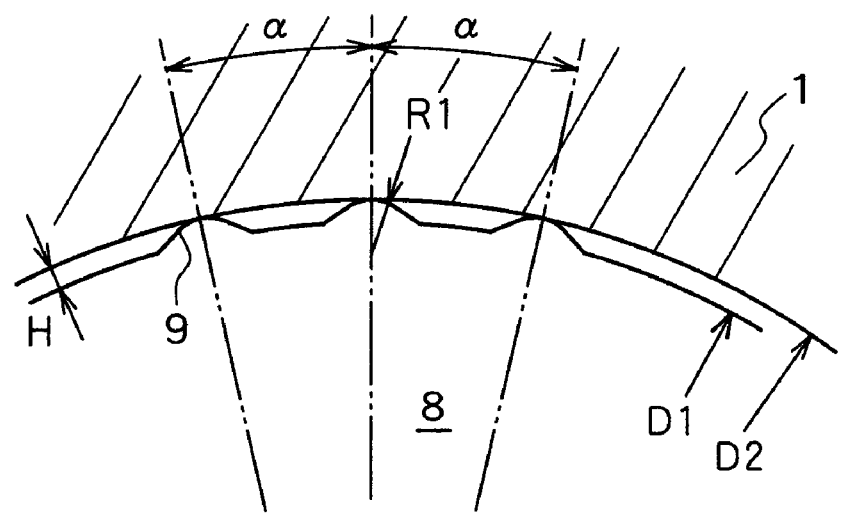
FIG. 4 is a view showing a circumferential cross-section of a recessed part.

Each recessed part 9 is formed of a circular groove having a radius R1, and it is arranged every uniformly divided angle .alpha. on the circumference, as shown in FIG. 4, so as to be in contact with an inscribed diameter D2 larger by a distance H than the inside diameter D1 of the barrel 1. The distance H is as shallow as 1.0-2.0 mm, for example, in laboratory size, although it is varied depending on machine size. The ratio of the distance H to the inside diameter D1 is preferably set to 0.5-2%. The radius R1 is as large as 3 times or more the distance H. Therefore, the recessed part 9 is formed as a shallow and wide groove. According to such a structure, the material is never stayed in the recessed part 9. When the uniformly divided angle α is narrowed, and the radius R1 is increased, the recessed part 9 can be made wider than the remaining protruding part (bank-like protruding part, etc.) of the radius D1. By constituting the recessed part to be relatively small to the protruding part in this way, the staying of the material in the recessed part can be minimized.

Figure 5:
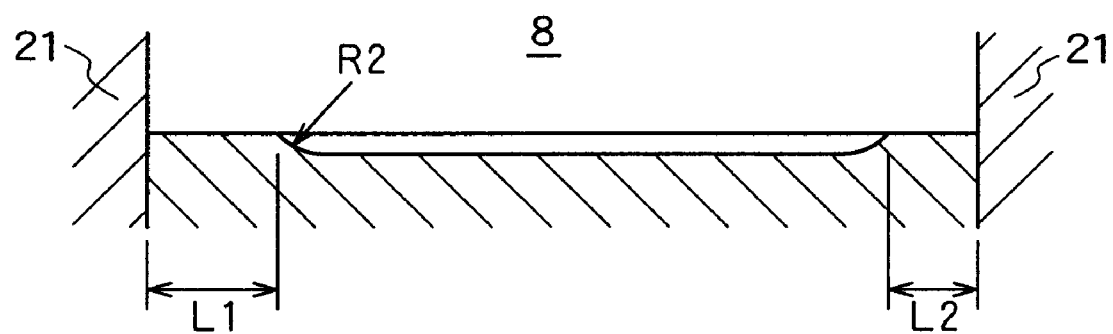
FIG. 5 is a view showing an axial cross-section of the recessed part.

As shown in FIG. 5, both the axial ends of the recessed part 9 are provided apart from the end plates 21 by prescribed distances L1 and L2. L1 is longer than L2, and located on the short blade side of the rotors 15 and 16, and L2 is located on the long blade side of the rotors 15 and 16. Both the axial ends of the recessed part 9 have a spherical shape having a radius R2 so as to be smoothly continued to the inside of the chamber 8.

In the batch mixer of the above structure, the material is supplied from the vertically long shoot mounted on the feed port 7, and pushed into the chamber 8 sealed by the drop door 2 and clamped by the latch 5 by lowering the floating weight 6. The pushed material is mixed by each rotor 4, 4 which is rotated so as to sweep the inner wall of the barrel 1 having the recessed parts 9. After the end of mixing, the latch 5 is retreated from the drop door 2 to release the clamp, and the drop door 2 is rotated downward around the fulcrum 2b and opened down to discharge the mixed material from the discharge port 3. After the material is discharged, the drop door 2 is rotated upward around the fulcrum 2b to block the discharge port 3 of the chamber 8 in preparation for the following mixing. When the drop door 2 is closed, the drop door 2 is pushed by the latch 5 and clamped to retain the sealing property in the chamber 8. The material is newly pushed into the chamber 8 through the feed port 7 by the floating weight 6, and the mixing is started. The sealed mixing machine X of the above structure repeats such a mixing cycle.

The area of the inner wall of the barrel 1 is increased by the recessed parts 9 provided in the barrel 1 of the batch mixer in this embodiment, and the material can be grasped by the action of the groove-like recessed parts 9 as slip stoppers. The axial material flow can be promoted by providing the groove-like recessed parts 9 in the axial direction of the barrel 1. By these means, the renewal of the material surface to make contact with the inner surface of the barrel 1 is accelerated, and the heat extraction performance by the cooling mechanism C of the barrel 1 is improved. The mixing energy applicable to the material up to the regulated discharge temperature can be increased by this improvement in heat extraction performance to improve the quality of mixing.

Further, since a sufficient shearing force is given to the material by the grasping effect by the groove-like recessed parts 9 to improve the dispersibility, and the distributing property is improved by the promoting effect of the material flow by the groove-like recessed parts 9, the quality of mixing is further improved.

The recessed part 9 has a circular section in FIG. 1. The same effect can be obtained even if the radius of this circular arc is properly changed, or the number of circular arcs is increased. Further, a V-shaped section or optional curved section (e.g., corrugated shape), although not shown, is adaptable to improve the controllability of the material temperature because the area of the barrel inner wall can be extended. The recessed parts 9 are preferably groove-shaped, but the same effect can be obtained even if dent-like independent recessed parts are scattered. A shape such that protruding parts are scattered in a wide recessed part, although not shown, is also adaptable to improve the controllability of the material temperature because the area of the barrel inner wall can be extended.

Although only the recessed part is described in the above, the same effect can be obtained even if the recessed part 9 is changed to a protruding part (bank-like protruding part, etc.).

The recessed part may be provided on the rotor as shown in FIG. 6. Namely, in a batch mixer having a barrel which forms a cylindrical sealed chamber having a section consisting of two mutually communicated circles and two rotors housed in the chamber to mix a material by rotation, a plurality of recessed parts may be provided on the surface of the rotors. The recessed parts may be formed of grooves extended in the direction crossing to the rotating direction of the rotors.

As shown in FIG. 6, the rotor 41 has a space 45 for circulating the cooling medium in the center P. Recessed parts 42 are provided on the surface of the rotor 41 to extend the surface area, whereby the recessed parts 42 can grasp the material as slip stoppers, and the heat extraction performance can be improved. The recessed parts 42 are provided on the surface except the tip 44 of the rotor 41, which is opposed to the rotating direction side of the rotor 41.

Since a sufficient shearing force is given to the material by the grasping effect by the recessed parts 42 to improve the dispersibility of the material, the controllability of material temperature is improved.

Each recessed part 42 has a circular section in FIG. 6, but the same effect can be obtained even if the radius of the circular arc is properly changed, or the number of circular arcs is increased. A V-shape or any curved shape (e.g., corrugated shape), although not shown, is also adaptable to improve the controllability of the material temperature since the area of the barrel inner wall can be extended.

Further, grooves are provided vertically to the rotating direction of the rotor 41 although not shown, whereby the flow of the material in the axial direction of the rotor 41 can be promoted. Consequently, the renewal of the contact surface of the material with the rotor 41 can be effectively performed, and the improvement in heat extraction performance and improvement in distributing property of the material can be attained.

The same can be said when the grooves are spirally provided with a prescribed twisting angle. Accordingly, since the controllability of the material temperature can be improved, the mixing energy applicable to the material up to the regulated discharge temperature can be increased, and the quality of mixing can be improved. The recessed parts are easy to work because of the groove shape.

Although only the recessed part is described in the above, the same effect can be obtained even if the recessed part 42 is changed to a protruding part (bank-like protruding part, etc.).
(Example of Examination)

The batch mixer having grooves on the barrel inner wall, which has the structure shown in FIG. 1, and a conventional batch mixer having no groove on the barrel inner wall were comparatively examined.

In FIG. 4, the recessed (circular) parts 9 are provided in a groove depth (H) of 1 mm on the barrel inner wall of the batch mixer of the present invention used in the examination. In this examination, the adjacent recessed parts 9 are provided every 10°. ($\alpha$) around the axis P of the rotor 4 in the vertical direction to the axial direction of the rotor 4, and the radius (R1) of the circular arc is 6 mm.

In this examination, the conventional batch mixer and the batch mixer of the present invention having the same chamber diameter (inside diameter D1: 130 mm) were used, and the discharge temperature of the material was set constant.

As a result of measurement of the overall heat transfer coefficient of barrel, it could be confirmed that the overall heat transfer coefficient of barrel of the batch mixer of the present invention is 1.6 times or more that of the conventional batch mixer.

The relation between material temperature and specific energy supplied in examination for the conventional batch mixer and the batch mixer of the present invention is shown in FIG. 7.

As is apparent from FIG. 7, the material temperature in the batch mixer of the present invention is low, compared with the conventional batch mixer if the specific energy supplied is equal. Accordingly, the improvement in the controllability of material temperature by the present invention could be confirmed.

Mooney viscosity and carbon dispersibility, which are evaluated as quality, were also measured. The relation between Mooney viscosity and specific energy supplied and the relation between dispersion degree of carbon and specific energy supplied in examinations for the conventional batch mixer and the batch mixer of the present invention are shown in FIGS. 8 and 9, respectively.

As is apparent from FIG. 8, the Mooney viscosity of the material is lower in the batch mixer of the present invention, compared with the conventional batch mixer if the specific energy supplied is equal. Since the material having the lower Mooney viscosity has the more satisfactory quality, the improvement in quality of the material by the present invention could be confirmed.

As is apparent from FIG. 9, the dispersion degree of carbon of the material is high in the batch mixer of the present invention, compared with the conventional batch mixer if the specific energy supplied is equal. Since the material having the higher dispersion degree of carbon has the more satisfactory quality, the improvement in quality of the material by the present invention could be confirmed.

What is claimed is:

1. A batch mixer comprising:
   a barrel having a sealed chamber with a section comprising two mutually communicated circles which are communicated throughout the length of the chamber;
   two rotors mounted in the chamber for rotation in a direction of rotation, each of said rotors including at least one rotor blade shaped to cooperate with the inner wall of the barrel to shear a material in the chamber during rotation of the rotors in a rotating direction;
   a plurality of recessed parts on each of the rotor blade surfaces of at least one of said rotor blades, wherein the plurality of recessed parts are provided only on the leading blade surfaces during the rotation of the rotors in the rotating direction, except at the tip of said rotor blade, wherein each of said recessed parts is elongated along the surface of the rotor blade;
   a space in each of said rotors for circulating a cooling medium;
   a material feed opening for feeding the material into the chamber;
   a material discharge opening provided at an underside of the barrel;
   means for closing said material feed opening during mixing of the material in the chamber; and
   means for closing said material discharge opening during mixing of the material in the chamber.

2. The batch mixer according to claim 1 wherein said recessed parts are grooves.

3. A batch mixer comprising:
   a barrel having a sealed chamber with a section comprising two mutually communicated circles which are communicated throughout the length of the chamber;
   two rotors mounted in the chamber for rotation in a direction of rotation, each of said rotors including at least one rotor blade shaped to cooperate with the inner wall of the barrel to shear a material in the chamber during rotation of the rotors in a rotating direction;
   a plurality of protruding parts on each of the rotor blade surfaces of at least one of said rotor blades, wherein the plurality of protruding parts are provided only on the leading blade surfaces during the rotation of the rotors in the rotating direction, except the tip of said rotor blade, wherein each of said protruding parts is elongated along the surface of the rotor blade;
   a space in each of said rotors for circulating a cooling medium;
   a material feed opening for feeding the material into the chamber;
   a material discharge opening provided at an underside of the barrel;
   means for closing said material feed opening during mixing of the material in the chamber; and
   means for closing said material discharge opening during mixing of the material in the chamber.

4. The batch mixer according to claim 1 wherein the recessed parts extend in a direction crossing the rotating direction of the rotors.

5. The batch mixer according to claim 3 wherein the protruding parts extend in a direction crossing the rotating direction of the rotors.

* * * * *